Patented Sept. 30, 1952

2,612,505

UNITED STATES PATENT OFFICE 2,612,505

AMINOALKYL DERIVATIVES OF THIOPHENE

Howard D. Hartough, Pitman, and Sigmund J. Lukasiewicz, Woodbury, N. J., assignors to Socony-Vacuum Oil Company, Incorporated, a corporation of New York No Drawing. Application January 3, 1951, Serial No. 204,264

6 Claims. (Cl. 260—329)

The present invention relates to the condensation of thiophene and thiophene derivatives with formaldehyde and its polymers and ammonia and amines. In particular, the present invention relates to the production of thenyl amines (aminomethylthiophenes), subresinous bodies and resinous bodies by a reaction involving thiophene or alkylthiophenes or halothiophenes or alkoxythiophenes and the like, or in general compounds having an unsubstituted thiophene nucleus or compounds having stable electropositive substituents other than unstable $(OH)^-$ and $(NH_2)^-$ groups attached to the thiophene nucleus, formaldehyde or its polymers and ammonium halide or amine salts. (The nomenclature employed herein is that of Steinkopf.)

Blicke and Burckhalter synthesized 2-thenyl amine by treating 2-(bromomethyl)-thiophene with hexamethylenetetramine (J. A. C. S. 64, 477 (1942)). The product of this primary reaction was then treated with hydrochloric acid in the presence of ethyl alcohol to obtain 2-thenyl amine hydrochloride. The free amine had a boiling point of 73–75 degrees centigrade at 11 millimeters of mercury (195–200° C. at 760 millimeters of mercury). Putokhin and Egonova obtained 2-thenyl amine in yields of 50–55 per cent by reducing 2-thenyl oxime ($C_4H_3S-CH=NOH$) with zinc dust and hydrochloric acid [J. Gen. Chem. (U. S. S. R.) 10, 2873 (1940)]. They reported that the free amine possessed the following physical properties: boiling point at 26 millimeters of mercury—88 degrees centigrade (195° C. at 760 millimeters of mercury), $D_4^{15}=1.1370$ and refractive index, $n_D^{15}=1.5678$.

It has now been found that 2-thenyl amine, di-(2-thenyl) amine and polymeric amines can be produced by the condensation of thiophene with ammonium halide by means of a highly reactive aldehyde such as formaldehyde. The following equation generalizes the reaction:

solution of the hydrohalides of amines I, II and III. Amines I, II and III can be separated as the free bases by the addition of caustic. Amine III can be separated by weaker basic materials such as sodium acetate.

The free amines can be obtained from the hydrohalides by standard procedures, for example, by treatment of the hydrochlorides with aqueous caustic followed by extraction with benzene from a saturated salt solution. Amine I and amine II have been isolated in the pure state by distillation in vacuum. Amine III thermally polymerizes when heated to temperatures exceeding 200–210 degrees centigrade.

It is to be noted that analyses of amine III and the chemical properties thereof indicate that it is a polymeric amine containing several units of the $C_4H_3S.CH_2-N=$ type. It is not a tri-(2-thenyl) amine because the sulfur content is too low while the nitrogen content and the molecular weight are too high for the trithenyl amine.

Amines I and II, i. e., 2-thenyl amine and di-2-thenyl amine, respectively, are strongly basic, form addition complexes with carbon dioxide on contact with air and dissolve rubber on contact. They may be distilled to a water-white product but soon show a yellow discoloration.

Amine III (the polymeric amine) is a weakly basic amine that can be freed of its hydrochloride by neutralization with sodium acetate. Amines I and II cannot be so freed. This characteristic indicates that amine III contains tertiary amine groupings.

The formaldehyde to be used in this reaction may be in the form of an aqueous solution such as the conventional aqueous solution containing 36–40 per cent formaldehyde, known commercially as Formalin, or in the form of paraformaldehyde or trioxane. When polymeric forms of formaldehyde are used, it has been found advantageous to add a small amount, say a few

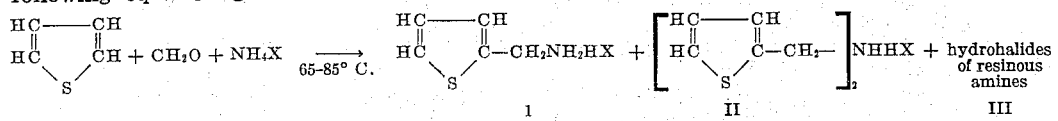

These hydrohalides of the resinous amines are very readily soluble in water. They, as well as the hydrohalides of amides I and II dissolve in the aqueous portion of the reaction mixture and thus are readily separated from the unreacted thiophenes. When polymeric formaldehyde is employed the water of reaction is sufficient to effect milliliters of water or of an acid per mole of formaldehyde. The acid to be used in one with a dissociation constant of about $10^{-4}$ or less, such as acetic acid.

Hexamethylenetetramine when mixed with thiophene and hydrochloric acid slowly added gives rise to the same reaction and the same products as are obtained by condensing thiophene, ammonium chloride and formaldehyde. Thus, hexamethylenetetramine and hydrochloric acid may be substituted for formaldehyde and ammonium chloride.

Accordingly, it is an object of this invention to provide a method for producing 2-thenyl amine and di-2-thenyl amine. It is another object of the present invention to provide a method for producing derivatives of 2-thenyl amine and di-2-thenyl amine. It is a further object of the present invention to provide a method for producing sub-resinous and resinous bodies from thiophene and compounds containing the thiophene nucleus having stable electropositive substituents other than hydroxyl [(OH)] or amino [(NH$_2$)] groups attached to the thiophene nucleus, formaldehyde or its polymers and ammonium halides other than the fluoride. Other objects and advantages will become apparent from the following description.

Before proceeding with a general discussion of the present invention it appears desirable to discuss the significance of the term stable electropositive substituents. In normal substitution reactions in the thiophene series such as aminomethylation and acylation one is only concerned with the groups that normally orient to the ortho- and para-positions in the benzene series since it has been found that groups which are typically meta-directing in the benzene series inactivate the thiophene nucleus so that these two reactions fail to take place. Also, it has been recognized that the substitution rules valid for benzene chemistry do not apply to thiophene chemistry. The sulfur atom in the thiophene nucleus exerts an orientation effect on entering substituents, while, in benzene, substitution is random, all positions being equivalent. The directive influence or orientation factors of benzene result only from a substituent group on the benzene nucleus. On the other hand, any substituent on the thiophene nucleus is either additive to or in competition with the directive influences already within the thiophene nucleus. Thus, a typical meta-directing group for members of the benzene series may have little or no directional influence on any entering substituent for members of the thiophene series. Therefore, it is necessary to examine these substituents as to their electronic or electrophilic nature to devise a classification based upon very elementary concepts for the purpose of distinguishing between those derivatives of thiophene which will participate in the concerned reaction to provide satisfactory results as those which are not concerned herewith.

The term, electropositive substituents, was chosen to designate, in the thiophene series, groups that are normally considered in the benzene series to ortho- and para-directing groups. In the same manner, the term, electronegative substituents, designates those groups which are meta-directing in the benzene series.

The concept of both terms finds its origin in the electrochemical theory of Berzelius in 1820. The following quotation from Johnson and Haber, "Theories of Organic Chemistry," John Wiley and Sons, N. Y. C., 1922, pp. 3-4, best illustrates the basis of the concept: "The simple combination of positive and negative elements furnishes compounds of the first order. Since the electrical charges in these compounds are not necessarily neutralized, there might remain a surplus of positive or negative charges which would enable them to enter into further combination forming compounds of the second order. Thus, for example, sodium oxide, formed by the union of sodium and oxygen, is a compound of the first order possessing free positive electricity, while SO$_3$, formed from sulfur and oxygen, is a compound belonging to the same order but possessing free negative electricity. It is obvious that these compounds may in turn combine, by virtue of their opposite polarities, to form sodium sulfate."

A similar interpretation can be applied to benzene chemistry. Although the actual terms "electropositive substituents" and "electro-negative substituents" are not found therein, Paul D. Bartlett shows in Gilman, "Organic Chemistry," John Wiley and Son, N. Y. C., 2nd edition, vol. I, 1943, pp. 208-209, in a discussion of the orientation in chlorobenzene, an excellent interpretation of this tendency for one group to furnish electrons to the aromatic group, producing thereby a negative charge on the benzene nucleus thus making the substituent group positively charged or a "electropositive substituent" by sharing its electrons with the aromatic nucleus. Thus, other groups given by Gilman, page 203, in Table II of the ortho-para-type will also furnish electrons to the benzene nucleus. These can also be classified as "electropositive substituent groups."

Karrer, "Organic Chemistry," Elsevier (1947), pp. 405 and 406, makes this statement "When new substituents are introduced into an already substituted benzene nucleus, they cannot, as a rule, enter any desired position. The positions they take up are affected by the groups already present; these 'direct' the incoming groups to definite positions. Two classes of substituents may be differentiated, those which direct an incoming substituent chiefly into the ortho- and para-positions, and those which are meta directing. To the first class belong Cl, Br, I, CH$_3$C$_n$H$_{2n+1}$, OH, NH$_2$; and to the second class

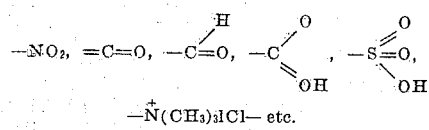

It will be noticed that the members of the latter class have very often double bonds, whereas substituents of the first class are saturated."

It follows that "electropositive," or ortho- and para-directing substituents are Cl, Br, I, CH$_3$, C$_n$H$_{2n+1}$ OH, and NH$_2$ and that "stable electropositive" substituents are Cl, Br, I, CH$_3$, and C$_n$H$_{2n+1}$ thereby excluding groups such as —NH$_2$ and —OH wherein the parent compounds are known to be highly unstable. Consequently, the term, "stable electropositive substituent groups," as used herein includes in part —OR, —R (where R is an alkyl group), —Cl, —Br, —I, —C$_6$H$_5$,

—CH$_2$COOH, —NHCOCH$_3$,

—CH$_2$CN, —CH=CHCOOH, —CH=CHCOOR

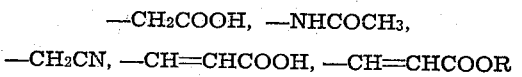

(where R is alkyl or aryl), —C≡C—COOR (where R is alkyl or aryl) and —CH$_2$X (where X is Cl, Br or I).

For general interest in this connection, "electronegative substituents," i. e., meta-directing groups in the benzene series, are the groups withdrawing electrons from the benzene nucleus or any aromatic nucleus having resonance such as thiophene. Typical examples are the —NO$_2$, —SO$_3$H, —COCH$_3$, —COOH and —CHO groups.

In general, the method for producing the thenyl amines and their derivatives involves reacting thiophene or its derivatives as defined hereinbefore with formaldehyde or its polymers and an ammonium halide other than the fluoride. The reaction occurs to produce mono- and di-thenyl amines and sub-resinous to resinous bodies dependent upon the conditions under which the reaction takes place.

When ammonium halide, formaldehyde and of ammonium halide is used whether the thiophene or the formaldehyde be in excess and that an increase in the amount of sub-resinous body appears to be correlated with the disappearance of a proportionate amount of secondary amine.

The data in Table II show that the fundamental reaction takes place in a ratio of reactants of about 0.5 mole of thiophene for 1 mole of formaldehyde and 0.5 mole of ammonium halide, i. e., a mole ratio of 1:2:1.

TABLE II

| Run No. | Moles of Reactants | | | Mole Ratio | Moles of Reactants Recovered | | | Moles of Reactants Utilized in Reaction | | | Mole Ratio |
|---|---|---|---|---|---|---|---|---|---|---|---|
| | $C_4H_4S$ | Aqueous $CH_2O$ | $NH_4Cl$ | | $C_4H_4S$ | $CH_2O$ | $NH_4Cl$ | $C_4H_4S$ | $CH_2O$ | $NH_4Cl$ | |
| 5 | 4 | 2 | 1 | 1:0.5:0.25 | 2.9 | 0 | 0 | 1.1 | 2 | 1 | 1:2:1 |
| 1 | 5 | 10 | 5 | 1:2:1 | 1.0 | 0 | 1 | 4 | 10 | 4 | 1:2.5:1 |
| 2 | 2 | 2 | 2 | 1:1:1 | 1.0 | 0 | 0.95 | 1 | 2 | 1.05 | 1:2:1 |
| 3 | 4 | 2 | 2 | 2:1:1 | 3.0 | 0 | 1.13 | 1 | 2 | 0.87 | 1:2:1 | thiophene or its derivatives having stable electropositive substituent groups other than the unstable hydroxyl or amino groups are reacted at temperatures below about 85 degrees centigrade for periods of time up to three hours, three products are obtained; to wit: primary amine, secondary amine and sub-resinous bodies having some of the characteristics of a tertiary amine. The proportion of each of these products in the final product can be controlled by controlling the mole ratio of the reactants. For example, employing formalin, ammonium chloride and thiophene the proportions of primary amine, secondary amine and sub-resinous body may be controlled as shown in Table I. The results tabulated in Table I were obtained by heating the reaction mixture at about 70 to about 80 degrees centigrade for about 1.5 hours. Thereafter the unreacted thiophene was removed, a diluent added to the residual liquid, ammonium chloride crystals removed, diluent removed, residual liquid neutralized with strong caustic in the presence of benzene, the neutralized liquid extracted three times with benzene, the benzene stripped off and the residue distilled in a vacuum. The fraction boiling between 190-205 degrees centigrade (corrected to 760 millimeters of mercury) was considered to be primary amine, that boiling at 250-291 degrees centigrade (corrected to 760 millimeters of mercury) was considered to be secondary amine and the residue was the sub-resinous body.

The variation of the molar ratio causes a variation in the molecular weight of the sub-resinous body as well as the proportion of sub-resinous body to the primary and secondary amines in the reaction product. The variation in molecular weight of the sub-resinous body with the variation in molar ratio of original reactants is demonstrated by the data in Table III.

TABLE III

| Run No. | Moles of Reactants | | | Mole Ratio | Molecular Weight of Benzene Soluble Sub-resinous Body |
|---|---|---|---|---|---|
| | $C_4H_4S$ | Aqueous $CH_2O$ | $NH_4Cl$ | | |
| 6 | 1.2 | 1 | 1 | 1.2:1:1 | 637 |
| 7 | 1 | 2 | 1 | 1:2:1 | 1,137 |

(Those skilled in the art know that molecular weight determinations of this magnitude are subject to an experimental error of about ±10 per cent.) Thus, when formaldehyde is used in excess of the proportion 1:1:1 the molecular weight of the sub-resinous body is increased. The sub-resinous body or amines are insoluble in alcohol, ether, chloroform and mineral oil and soluble in benzene and dioxane. The sub-resinous amines are viscous, light red to brown oils having an odor of amines.

Although it has been demonstrated that vari-

TABLE I

| Run No. | Moles of Reactants | | | Mole ratio | Yield as percent of Total Product | | |
|---|---|---|---|---|---|---|---|
| | $C_4H_4S$ | Aqueous $CH_2O$ | $NH_4Cl$ | | Amine I | Amine II | Sub-resinous Body |
| 1 | 5 | 10 | 5 | 1:2:1 | 17.6 | 5.3 | 77.0 |
| 2 | 2 | 2 | 2 | 1:1:1 | 15.6 | 3.1 | 80.0 |
| 3 | 4 | 2 | 2 | 2:1:1 | 17.7 | 20.3 | 62.0 |
| 4 | 5 | 4 | 4 | 1.25:1:1 | 22.2 | 22.2 | 77.7 |
| 8 | 1 | 1 | 3 | 1:1:3 | 36.8 | 15.2 | 48.0 |

The foregoing data show that the amount of sub-resinous bodies in the reaction product can be kept at a minimum by using an excess of thiophene and/or ammonium halide. Furthermore, that the amount of primary amine produced is substantially constant unless an excess ation in the molar ratio of the thiophene and formaldehyde does not cause any appreciable variation in the proportion of primary amine in the product unless an excess of ammonium halide is used, it has been found that the yield of primary amine and secondary amine can be increased and the yield of sub-resinous amines reduced by employing an amount of ammonium halide in excess of the molar ratio 1:2:1. That is, if the amount of ammonium halide employed is two or more moles for each mole of thiophene and each two moles of formaldehyde, the yield of primary and secondary amines is increased while the yield of sub-resinous amines is reduced. This is demonstrated in Table IV.

TABLE IV

| Example No. | Moles of Reactants | | | Mole Ratio | Moles of Thiophene Utilized | Yield as per cent of theoretical | |
|---|---|---|---|---|---|---|---|
| | $C_4H_4S$ | Aqueous $CH_2O$ | $NH_4Cl$ | | | Amine I | Amine II |
| XIII | 2 | 2 | 2 | 1:1:1 | 1.7 | 11 | 3 |
| II [1] | 2 | 2.5 | 2.0 | 1:1.25:1 | 1.7 | 17 | 9 |
| XII | 5 | 10 | 5 | 1:2:1 | | 14 | 7 |
| XIV | 4 | 2 | 2 | 2:1:1 | 1.4 | 13 | 16 |
| I | 2 | 1.23 | 1.03 | 2:1:1 | 0.53 | 13 | 12 |
| X | 1 | 1 | 3 | 1:1:3 | 0.37 | 42 | 18.3 |

[1] Formaldehyde provided by hexamethylenetetramine; 2 moles of aqueous hydrochloric acid added.

In order to obtain the data presented in Table IV the reactants were mixed, brought to a reflux at about 70–75 degrees centigrade and allowed to reflux for about one hour. The excess thiophene was removed by steam distillation. The residual oil was then fractionated in vacuo to obtain one cut boiling at 190–205 degrees centigrade (corrected to 760 millimeters of mercury) (primary amine) and a second fraction boiling at 250–291 degrees centigrade (corrected to 760 millimeters of mercury) (secondary amine). The yields were then calculated on the basis that the original amount of thiophene less the thiophene recovered as such is equal to the amount of thiophene which reacted. The per cent yield of each amine was then calculated on the amount of thiophene which reacted.

While the proportion of sub-resinous body can be kept at a minimum by reacting an amount of thiophene or ammonium halide in excess of that required for the molar ratio 1:1:1, the total yield and amount of sub-resinous amines can be increased by increasing the molecular proportion of formaldehyde. This relation is demonstrated in Table V, the data for which were obtained by mixing the reactants in the molecular proportions shown and refluxing the reaction mixture for three hours. The reaction mixture was then neutralized and extracted with benzene. The yield of primary and secondary amines was very low. No formation of resinous products was observed. The crude sub-resinous amines were analyzed for sulfur, nitrogen and hydroxyl group and the molecular weight determined. It is to be noted that aqueous formaldehyde was used. When aqueous formaldehyde is replaced by paraformaldehyde in these proportions only resinous materials are obtained. However, when the sub-resinous products listed in Table V are heated, hard resinous products are obtained. It is also to be noted that exposure of films of these sub-resinous amines to the air over a period of time produces a resinous hard film.

TABLE V

| Example No. | Moles of Reactants | | | Grams Yield | Sub-resinous Amines | | | |
|---|---|---|---|---|---|---|---|---|
| | $C_4H_4S$ | Aqueous $CH_2O$ | $NH_4Cl$ | | Percent S | Percent N | OH No. | Molecular Weight |
| XIX | 1 | 1 | 0.5 | 59 | 20.6 | 5.65 | 285 | 725 |
| XX | 1 | 3 | 1 | 91 | 22.9 | 6.21 | 199 | 620 |
| XXI | 1 | 4 | 2 | 117 | 20.6 | 7.3 | 475 | |
| XXII | 1 | 4 | 1 | 132 | 21.2 | 8.8 | 370 | 651 |

These analyses lead to the postulation that these sub-resinous amines may be represented by the empirical formula $(C_4H_nS—(CH_2)_2N)_4Q_m$ where Q is the moiety reacting in the A. S. T. M. determination of hydroxyl number, $n$ equals zero to 3 and $m$ is 4 to 5. The calculated values for sulfur and nitrogen, the hydroxyl number and molecular weight based on this formula are Percent sulfur _____ 19.2
Percent nitrogen _____ 8.4
Hydroxyl No. _____ 340
Molecular weight _____ 668

These values are to be compared with the observed values for the sub-resinous amines produced in Example XXII. The following formula may be said to represent the sub-resinous product obtained in Example XX:

$$[(C_4H_nS)_3(CH_2)_9N_2(OH)_2]^{1-2}$$

where $n$ equals zero to 3.

| | Calculated for Monomer | Found |
|---|---|---|
| Percent Sulfur | 22.0 | 22.9 |
| Percent Nitrogen | 6.2 | 6.2 |
| Hydroxyl No. | 252 | 199 |
| Molecular Weight | 428 | 620 |

In view of the foregoing, it can then be said that the sub-resinous amines produced by the foregoing reaction are mixtures of materials having the formulas given hereinbefore.

Alkylthiophenes and, broadly, compounds in which stable electropositive substituents other than the unstable hydroxyl and amino groups are attached to the thiophene nucleus likewise react with formaldehyde and ammonium chloride to produce alkylthenyl amines. For example, when 2-amylthiophene is condensed with formaldehyde and ammonium chloride, a product is obtained which has a sulfur content of 19.3 per cent and nitrogen content of 2.85 per cent. This corresponds within experimental error with the sulfur content of 18.65 per cent and the nitrogen content of 2.72 per cent of the tertiary amine represented by the formula $(C_5H_{10}C_4H_3SCH_2)_3N$.

Thiophene is distinguished from benzene in at least one characteristic. Thiophene will react to a limited extent with the less reactive secondary amine hydrohalides and formaldehyde whereas benzene or its more reactive homologues will not react with primary or secondary amines nor with the more reactive ammonium halides. For example, when one mole each of thiophene, formaldehyde and dibutyl amine hydrochloride are reacted, 27 grams of material boiling between 298 and 308 degrees centigrade at 760 millimeters of mercury were obtained. Analyses of the material so obtained for sulfur and nitrogen indicated that the condensation occurred with the thiophene. On the other hand, when mixed trialkyl benzenes were reacted with formaldehyde and ammonium chloride in the same proportions, no reaction occurred. Furthermore, when an aromatic petroleum stock containing tri-nuclear aromatic hydrocarbons which are known to be highly reactive was reacted with formaldehyde and ammonium chloride in the same molar proportions, small amounts only, of the order of 1 to 2 per cent, of an amine were obtained.

The thenyl amines which are obtained by this method may be used as dye intermediates, antioxidants in lubricating oils, as insecticides, in the pharmaceutical industry as intermediates, and as intermediates in the production of other valuable materials.

The production of the thenyl amines and amines of thiophene derivatives is illustrated by the following non-limiting examples.

Example I

A mixture of 56 grams (1.03 moles) of ammonium chloride, 168 grams (2 moles) of thiophene and 100 grams (1.23 moles) of 37 per cent aqueous formaldehyde were heated for three hours at 74 degrees centigrade. One hundred and fifteen grams of unreacted thiophene were recovered by decantation. To the resulting reaction product, a thick red syrup, ethyl alcohol was added. The mixture was filtered to remove the unreacted ammonium chloride. (This step need not be included in the process when the amine III is desired since the amount of ammonium chloride used in the reaction can be controlled making recovery unnecessary.) Ethyl alcohol was evaporated off on a steam bath and the thick red syrup neutralized with strong potassium hydroxide solution in presence of benzene. Three extractions with benzene from a saturated salt solution were necessary to remove the liberated amines. Benzene was stripped off and 42.0 grams of a dark brown oily liquid remained. Distillation in vacuo gave: 9.0 grams of 2-thenyl amine (I), B. P. 55–65 degrees centigrade at 5 millimeters of mercury (190–203 degrees centigrade at 760 millimeters), $n_D^{20}$ 1.5650; 8.0 grams of di-(2-thenyl) amine (II), B. P. 115–145 degrees centigrade at 7 millimeters (250–291 degrees centigrade at 760 millimeters) $n_D^{20}$ 1.5914; 25 grams of residue of unknown constitution.

Analysis.—Calculated for $C_5H_7SN$ (I): Nitrogen, 12.38 per cent; sulfur, 28.35 per cent. Found: Nitrogen, 12.1 per cent; sulfur, 27.1 per cent. Calculated for $C_{10}H_{11}S_2N$ (II): Nitrogen, 6.7 per cent. Found: Nitrogen, 6.17 per cent. Residue, found: Nitrogen, 6.97 per cent; sulfur, 16.7 per cent.

Phenyl thiourea derivative of (I), three recrystallizations from alcohol, M. P. 121–122.5 degrees centigrade (uncorrected). Calculated for $C_{12}H_{12}N_2S_2$: Nitrogen 11.3 per cent. Found: Nitrogen, 10.8 per cent. Oxidation of (I) with alkaline permanganate gave 2-thiophene carboxylic acid, M. P. 129.5–130 degrees centigrade (uncorrected).

The physical characteristics of several other derivatives are collected in Table VI.

TABLE VI

| | M. P., °C.[1] | B. P., °C. at 3 mm. | Percent N | | Percent S | |
|---|---|---|---|---|---|---|
| | | | Calc. | Found | Calc. | Found |
| 2-Thenyl stearamide | 92.5–93 | | 3.7 | 3.9 | | |
| 2-Thenyl benzamide | 121–122 | | 6.4 | 6.3 | | |
| 2-Thenyl acetamide | | 127–128 | | | | |
| 2-Thenylaminebenzaldehyde | | 142–144 | 6.9 | 6.3 | | |
| 2-Thenylurea | 126–128 | | 17.9 | 15.8 | 20.5 | 21.5 |
| sym. Di-(2-thenyl) urea | 152–156 | | 11.2 | 11.1 | 25.5 | 24.6 |
| 2-Thenyl phthalimide | [2] 125 | | 5.76 | 5.65 | | |
| Di-(2-thenyl) phthalamide | [2] 167 | | 7.81 | 7.86 | | |

[1] All melting points (uncorr.).
[2] Block method.

Example II

To a mixture of 168 grams (2 moles) of thiophene and 70 grams (0.5 mole) of hexamethylenetetramine equivalent to 2.5 moles of formaldehyde, 200 grams (2.0 moles) of aqueous hydrochloric acid was dropped into the reaction vessel during a period of forty minutes. The reaction mixture was kept for one hour at 76–80 degrees centigrade. Twenty-five grams of thiophene were recovered by distillation. The reaction mixture was diluted with alcohol and filtered to remove the ammonium chloride. The alcohol was evaporated off and the concentrate treated with 100 grams of sodium hydroxide in 200 grams of water. The liberated amine was extracted with benzene. The benzene was stripped off and distillation of the amine in vacuo gave: 33.0 grams of 2-thenyl amine (I), B. P. 192–205 degrees centigrade at 760 millimeters. Sixteen grams of di-(2-thenyl) amine (II), B. P. 260–280 degrees centigrade at 760 millimeters and 100 grams of residue.

Phenyl thiourea derivative of I, three recrystallizations from alcohol, M. P. 122–122.5 degree centigrade (uncorrected).

Example III

An anhydrous mixture of 84.0 grams (1.0 mole) of thiophene, 30.0 grams (1.0 mile) of paraformaldehyde and 54.0 grams (1.0 mole) of ammonium chloride were heated for 1½ hours at reflux temperature. No reaction took place.

Example IV

A mixture of 252 grams (3.0 moles) of thiophene, 60 grams (2.0 moles) of paraformaldehyde, 108.0 grams (2.0 moles) of ammonium chloride and 20 grams of acetic acid were heated for three hours at 78 degrees centigrade. The procedure from here on is the same as in Example I. Yield of crude amine 112 grams. The nitrogen analysis of these crude amines gave 6.5 per cent. Distillation in vacuo gave 17 grams of (I), 7 grams of (II), and 84 grams of residue.

*Analysis.*—Calculated for $C_{10}H_{11}S_2N$ (II): Nitrogen, 6.7 per cent. Found: Nitrogen, 6.98 per cent. Residue, found: Nitrogen, 5.8 per cent; sulfur, 28.3 per cent.

Example V

A mixture of 420 grams (5.0 moles) of thiophene, 120 grams (4 moles) of paraformaldehyde, 224 grams (4.1 moles) of ammonium chloride and 40 grams of acetic acid were reacted for 1½ hours at 74 degrees centigrade. Two hundred and seventy-four grams (65.3 per cent) of thiophene had reacted. The reaction product was treated with 270 grams of crystalline sodium acetate dissolved in 300 milliliters of water. A benzene insoluble liquid was obtained which weighed 68.0 grams when dried on the steam bath.

*Analysis.*—Sulfur, 17.40 per cent; nitrogen, 5.19 per cent; chlorine, 7.3 per cent.

The benzene soluble material was water washed two times and benzene stripped off. Yield 156 grams.

Example VI

A mixture of 168 grams (2 moles) of thiophene, 120 grams (4 moles) of paraformaldehyde, 108 grams (2 moles) of ammonium chloride and 20 grams of acetic acid were heated for 1½ hours at 74 degrees centigrade. The reaction product was treated with a saturated aqueous solution of 200 grams of crystalline sodium acetate and 300 milliliters of benzene as in Example V. The precipitated benzene-insoluble amine was treated with caustic solution and the free amine was dissolved in benzene. Benzene was stripped off and the amine had the following analysis:

Sulfur, 23.1 per cent; nitrogen, 4.67 per cent; hydroxyl No. 257; molecular weight, 1123.

The other portion, benzene-soluble amine, when analyzed gave: Sulfur, 23.85 per cent; nitrogen, 4.68 per cent; chlorine, 1.7 per cent.

Example VII

A mixture of 77 grams (0.5 mole) of amylthiophene, 15 grams (0.5 mole) of paraformaldehyde, 27 grams (0.5 mole) of ammonium chloride and 5 grams of acetic acid were reacted for one hour at 85 degrees centigrade. The refining procedure was the same as in Example I. Distillation in vacuo gave 31 grams (91 grams theoretical) of a residue boiling >265 degrees at 760 millimeters.

*Analysis.*—Found: Sulfur, 19.3 per cent; nitrogen, 2.85 per cent.

Example VIII

A mixture of 331 grams (3.94 moles) of thiophene, 60 grams (2 moles) of paraformaldehyde, 54 grams of ammonium chloride and 20 grams of acetic acid were heated for three hours at 77 degrees centigrade. Two hundred and forty-three grams of thiophene were recovered by distillation. The reaction product was then treated with sodium hydroxide (50 grams in 100 grams of water) in the presence of benzene. The liberated amine was extracted with benzene from the saturated salt solution. The benzene was stripped off on a five-plate laboratory glass column. Yield of crude amine was 129 grams. The theoretical yield is 130 grams assuming that 88 grams of thiophene had reacted. Distillation in vacuo gave: 13.4 grams of 2-thenyl amine (I), (10.3 per cent of theoretical); 109 grams of residue (84.0 per cent of theoretical), and 6.6 grams loss.

Example IX

A well stirred mixture of one mole (84 grams) of thiophene, one mole (81 grams) of aqueous 37 per cent formalin solution, and 3 moles of ammonium chloride were brought to a reflux of 72 degrees centigrade. In 15 minutes a yellow coloration began to take place. The reaction mixture was allowed to reflux one hour and then 25 cubic centimeters of water were added. The condenser was arranged for downward distillation and the excess thiophene was steam distilled off. In this manner 53 grams of thiophene was recovered and 33 grams (0.37 mole) of thiophene entered into the reaction. Rectification of the mixture by standard procedures gave 17.5 grams of 2-thenyl amine and 7.0 grams of di-(2-thenyl) amine as well as 23.0 grams of residue. This corresponds to a 42 per cent yield of 2-thenyl amine and an 18.3 per cent yield of di-(2-thenyl) amine.

Example X

To 49 grams (0.6 mole) of thiophene and 48 grams (0.6 mole) of aqueous formalin (36 per cent) were added 115 grams (1.2 moles) of ammonium bromide. The procedure here was the same as in previous examples. 9 grams of 2-thenyl amine (I), 6 grams of di-(2-thenyl) amine (II), and 16 grams of residue (III) was obtained.

Example XI

A mixture of 420 grams (5.0 moles) of thiophene, 300 grams (10 moles) of trioxymethylene, 270 grams (5.0 moles) of ammonium chloride and 50 grams of acetic acid were refluxed for 30 minutes. A heat of reaction began and the temperature was maintained between 74–84 degrees centigrade by means of an ice bath. The reaction mixture was stirred for an additional hour during which time the temperature dropped to 46 degrees centigrade. To the reaction mixture was then added 500 cubic centimeters of 95 per cent alcohol and filtered to remove the precipitated ammonium chloride. The alcohol was evaporated and the 991 grams of concentrate were treated with 6 moles of sodium hydroxide, in a 40 per cent solution, in the presence of benzene. The liberated amine was thus extracted with benzene. The benzene was topped off and distillation of the amine in vacuo gave 81.5 grams of 2-thenyl amine (I), 36.5 grams of di-(2-thenyl) amine (II) and 413.5 grams of residue.

The yields of I and II are 14 per cent and 7 per cent of theoretical, respectively.

Example XII

A mixture of 168 grams (2.0 moles) of thiophene, 60 grams (2.0 moles) of trioxymethylene, 108 grams (2.0 moles) of ammonium chloride and 10 grams of acetic acid were reacted at the desired temperature, 74–84 degrees centigrade for 1½ hours, 28 grams of thiophene were recovered. The refining procedure was the same as that in Example XI. The topped reaction product weighed 128.5 grams. Distillation of the free amine in vacuo gave 20 grams of 2-thenyl amine (I), 4.0 grams of di-(2-thenyl amine) (II) and 109 grams of residue.

The yields of I and II are 11 per cent and 3 per cent of theoretical, respectively.

*Example XIII*

A vigorously stirred mixture of 336 grams (4.0 moles) of thiophene, 60 grams (2.0 moles) of trioxymethylene, 108 grams (2.0 moles) of ammonium chloride and 20 grams of acetic acid were heated at 74–84 degrees centigrade for 1½ hours. The refining procedure was the same as in Example XI. Two hundreds and seventeen grams of thiophene and 63 grams of ammonium chloride were recovered.

Distillation of the liberated amine in vacuo gave 20.0 grams of 2-thenyl amine (I), 23.0 grams of di-(2-thenyl) amine and 77.0 grams of residue.

The yields of (I) and (II) are 13 per cent and 16 per cent of theoretical, respectively.

From the foregoing it will be recognized that thiophene and its alkyl derivatives react with aqueous formaldehyde and ammonium halides much more easily than with primary or secondary amine hydrohalides. It will also be evident that when polymerized forms of formaldehyde are used a small amount of acid such as acetic acid or, in general, in acid having a dissociation constant of $10^{-4}$ or less or any agent capable of depolymerizing the formaldehyde poymer, such as water, must be used. Furthermore, when hexamethylenetetramine is used, hydrochloric acid or one of the other hydrogen halides HBr or HI must be used. Accordingly, those skilled in the art will recognize that the production of high yields of primary and secondary thenyl amines involves reacting thiophene or its derivatives as defined hereinbefore with formaldehyde in the presence of at least 2 moles of ammonium chloride for each mole of thiophene at temperatures of 65 degrees centigrade to reflux temperature of about 85° centigrade for up to three hours, and preferably for about 1.5 to about 3 hours at the aforesaid reflux temperature. Aqueous formaldehyde can be replaced by its polymers or hexamethylenetetramine. However, when the polymers of formaldehyde are used, sufficient acid must be present to depolymerize the polymer and when hexamethylenetetramine is used, hydrohalide must be added.

A particular use has been discovered for the primary and secondary thenyl amines described hereinbefore. It has been discovered that these compounds can be used in lubricating oils to reduce or substantially completely inhibit the corrosion of bearings as indicated by the bubble test. As those skilled in the art know, the bubble test is described in many United States patents, for example, U. S. Patent No. 2,361,353.

The base or blank oil used in these tests was Pennsylvania solvent-refined oil of 53 seconds Saybolt Universal viscosity at 210 degrees Fahrenheit. The data present in Table VII show that both the primary and the secondary thenyl amines are effective inhibitors at concentrations as low as 0.06 per cent (1/16 of 1 per cent) by weight. Each test was carried out for 22 hours at 175 degrees centigrade.

TABLE VII

|  | Milligrams loss in weight | |
|---|---|---|
| Blank Oil | 20, 20, 20, 24; average=21 | |
|  | Percent additive | Mg. loss in weight |
| Compound: | | |
| 2-Thenyl amine | 1 | 0 |
|  | ½ | 0 |
|  | ¼ | 0 |
|  | ⅛ | 1 |
|  | 1/16 | 0 |
| Di-(2-thenyl amine) | 1 | 1 |
|  | ½ | 0 |
|  | ¼ | 1 |
|  | ⅛ | 1 |
|  | 1/16 | 0 |
|  | 1/32 | 15 |

While non-resinous primary and secondary thenyl amines together with sub-resinous nitrogenous materials of the nature of tertiary amines are produced by heating thiophene or derivatives thereof with formaldehyde or polymers thereof and ammonium halide (less readily with primary and secondary amines) for up to 3 hours at 75–80 degrees centigrade, essentially thermoplastic nitrogenous resins can be produced by heating thiophene and its derivatives having stable electropositive substituents attached to the nucleus with formaldehyde or its polymers and ammonium halides other than the fluoride for 3 hours at temperatures of 75–85 degrees Fahrenheit, or at the reflux temperature. Thus, when thiopene or alkyl thiopenes are heated for 3 hours with formaldehyde and ammonium halide or hexamethylenetetramine and hydrochloric acid or paraformaldehyde or trioxane, and acetic acid, the resins obtained by neutralizing the water solution are yellow to brown, thermoplastic, water-soluble resins.

Essentially the same end-products are produced whether aqueous formaldehyde in the form of formalin (37 per cent aqueous formaldehyde), paraformaldehyde, or trioxane be used in this reaction. Hexamethylenetetramine and hydrogen halide acid can be substiuted for formaldehyde and ammonium halide to produce essentially the same end-products.

The production of these nitrogenous type resins is illustrated by the following non-limiting examples.

*Example XIV*

A mixture of 168 grams (2 moles) of thiophene, 107 grams (2 moles) of ammonium chloride and 200 grams (2.5 moles) of 37 per cent aqueous formaldehyde were heated for six hours at 72 degrees centigrade. One hundred and thirteen grams (67.4 per cent) of thiopene had reacted. The resulting product, a thick, red syrup was dissolved in ethyl alcohol and filtered. Ethyl alcohol was removed by evaporation on a steam bath followed by neutralization with potassium hydroxide solution. A brown resinous material precipitated out. The yield was 145 grams The calculated yield was 169 grams.

*Analysis.*—Sulfur, 24.9 per cent; nitrogen 6.98 per cent.

*Example XV*

To 93 grams (1 mole) of aniline cooled in ice, 100 grams (1 mole) of aqueous hydrochloric acid was added. To the aniline hydrochloride salt, 84 grams (1 mole) of thiophene and 81 grams (1 mole) of aqueous formaldehyde were added and heated for six hours at reflux temperature (80 degrees centigrade). The thick syrup was diluted with alcohol and filtered. The solvent was stripped off and the residue neutralized with sodium hydroxide solution. A resinous product separated out which was washed with water and dried in vacuum dessicator. The yield was 145 grams (calculated yield 172 grams).

*Analysis.*—Sulfur, 1.03 per cent; nitrogen, 10.4 per cent.

*Example XVI*

To a mixture of 31 grams (0.5 mole) of urea, 41 grams (0.5 mole) of formalin and 42 grams (0.5 mole) of thiopene, 50 grams (0.5 mole) of concentrated hydrochloric acid was added slowly while the mixture was cooled. A white solid precipitate formed immediately. After heating for six hours at reflux temperature only a trace of thiopene could be detected. The reaction mixture was filtered and the solid was washed with water, then with dilute caustic solution followed with two water washes. The resinous material was dried for 12 hours in a steam oven. The yield of resin as the hydrochloride salt was 93 grams.

*Analysis.*—Sulfur, 14.2 per cent; nitrogen, 20.6 per cent; chlorine, 5.36 per cent.

Example XVII illustrates the use of alkyl and aryl polyamines.

*Example XVII*

To 30 grams (0.5 mole) of ethylene diamine cooled in an ice bath, 200 grams (2.0 moles) of concentrated hydrochloric acid were added. To the hydrochloride salt thus formed, 84 grams (1 mole) of thiopene and 81 grams (1 mole) of aqueous formaldehyde were added. The reaction mixture was stirred and heated for two hours at 75 degrees centigrade. The resulting reaction mixture was filtered and washed with alcohol. The solvent and unreacted thiopene were stripped off under vacuum. The yield of resinous material was 139 grams.

*Analysis.*—Found: Sulfur, 19.0 per cent; nitrogen, 5.98 per cent.

*Example XVIII*

Eighty-four grams (1 mole) of thiophene, 90 grams (1 mole) of paraformaldehyde (equivalent to 3 moles of formaldehyde), 54 grams (1 mole) of ammonium chloride and 20 grams of acetic acid were mixed together in a 500 milliliter 3-necked flask fitted with a mechanical stirrer, thermometer, and reflux condenser and heated to 75 degrees centigrade. Within a few minutes yellow to red coloration started and a vigorous heat of reaction set in necessitating ice bath cooling. After 15 minutes the heat of reaction subsided and the mixture was heated at 80–85 degrees centigrade for 2½ hours thereafter. The material was cooled, transferred to a beaker, and neutralized with 40 per cent sodium hydroxide solution. A solid yellow to brown resinous mass precipitated. This was water washed on a rubber mill and the following analyses obtained:

| | |
|---|---|
| Per cent sulfur | 21.5 |
| Per cent nitrogen | 6.09 |
| Per cent residual chlorine | 0.31 |
| Per cent ash | 1.0 |

*Example XIX*

Example IV was repeated using 1 mole of thiophene, 1.3 moles of trioxymethylene (equivalent to 4 moles of formaldehyde), 1 mole of ammonium chloride and 20 grams of acetic acid The following analyses were obtained on the resinous product:

| | |
|---|---|
| Per cent sulfur | 20.4 |
| Per cent nitrogen | 5.78 |
| Per cent residual chlorine | 1.00 |
| Per cent ash | 0.3 |

*Example XX*

Example IV was repeated using 1 mole of thiophene, 1.3 moles of trioxymethylene (equivalent to 4 moles of formaldehyde), 2 moles of ammonium chloride and 20 grams of acetic acid. The resin obtained was much more brittle than those of Examples VIII and XIX and appeared to have a molecular weight much higher than previous resins.

It will be seen from the foregoing that trioxymethylene is the preferred form of formaldehyde to produce resins. This is in contrast to the use of aqueous formaldehyde which generally results in the formation of sub-resinous bodies.

Examination of the foregoing data shows that an excess of formaldehyde over the other two ingredients is essential to produce resinous bodies and to produce minimum yields of thenyl amine, dithenyl amine, and viscous amine III which may be considered as sub-resinous intermediates in the formation of the desired resins.

In 1948 U. S. Patents Nos. 2,453,085 and 2,453,086 were granted to Philip D. Caesar and Alexander N. Sachanen and to Philip D. Caesar respectively. These patents disclose the preparation of thiophene-aldehyde and alkyl thiophene-aldehyde resins employing "well-known acidic condensing agents." Non-limiting examples of these acid condensing agents are sulfuric acid, hydrochloric acid, maleic acid, phosphoric acid, and anhydrous hydrofluoric acid as well as ammonium chloride, zinc chloride, mercuric chloride, and ammonium sulfate.

While it would seem that the resins prepared as described in the Caesar patents might be similar to those of the present invention, it is to be noted that the Caesar resins will only be nitrogenous when the condensing agent is ammonium chloride. On the other hand, when thiophene, formaldehyde and ammonium chloride are mixed in the molecular ratio of 1:1:1 and heated in a sealed tube for 5–10 hours at 100° C. a resin is obtained which in the hydrohalide form is water insoluble whereas when the three reactants are heated to not more than reflux temperature, i. e., about 85° C. a resin is obtained which in the hydrohalide form is soluble in water. Resins which are water-insoluble in the hydrohalide form are also obtained when aniline, urea, ethylene diamine, and the like as hydrohalides are reacted at reflux temperatures with thiophene and formaldehyde resins are obtained which in the hydrohalide form are insoluble in water.

One important use of the resins of the present invention is dependent upon this characteristic of solubility in water when in the form of hydrohalides. In the coating or impregnating of textile fibers in the past it has been customary to employ resinous materials in solution in non-aqueous solvents generally of flammable nature. With the advent of these novel resins which in the hydrohalide form are water-soluble it is now possible to impregnate textile fabrics with these novel water-soluble nitrogenous resins from an aqueous bath and treat the textile fiber impregnated with the hydrohalide form of the resin with a strong base such as caustic soda to free the amine base. In this way the use of non-aqueous, flammable solvents and the concomitant hazards are avoided.

The nitrogenous type resins described herein which in the hydrohalide form are soluble in water can be used in the common manner for which prior art thermoplastic resins have been employed. For example, they may be used to make textile fibers water-repellant as disclosed in copending application for U. S. Patent Serial No. 763,744, filed July 25, 1947, in the names of John W. Schick, Howard D. Hartough and Darwin E. Badertscher, now Patent 2,559,260, issued July 3, 1951. They may be used in conjunction with salts of copper, mercury and the like to provide water-repellant, mildew-proofed textile fabrics as disclosed in co-pending application Serial No. 763,743 filed July 25, 1947, in the names of Paul V. Keyser, John S. Schick and Howard D. Hartough, now Patent 2,582,870, issued January 15, 1952.

The present application is a continuation-in-part of our copending application Serial No. 636,511, filed December 21, 1945, and now abandoned.

We claim:

1. The method for producing nitrogenous condensation products having as a characterizing group the thiophene residue, $C_4H_nS$, wherein $n$ equals zero to 3, which comprises condensing at temperatures of about 65° C. to about 85° C. a thiophene compound selected from the group consisting of thiophene, an alkyl thiophene, and a halo thiophene, formaldehyde, and an ammonium halide selected from the group consisting of ammonium chloride and ammonium bromide, the reactants being present in the reaction mixture in the molar proportions of thiophene compound : formaldehyde : ammonium halide, of 1 to 5:0.3 to 4:0.25 to 4, to obtain a reaction mixture containing a hydrohalide salt of a basic nitrogenous condensation product, mixing said reaction mixture with an aqueous alkaline solution to decompose said hydrohalide salt and to set free said basic nitrogenous condensation product, and recovering the freed basic nitrogenous condensation product.

2. The method for producing nitrogenous condensation products having as a characterizing group the thiophene residue, $C_4H_nS$, wherein $n$ equals zero to 3, which comprises condensing at temperatures of about 65° C. to about 85° C. a thiophene compound selected from the group consisting of thiophene, an alkyl thiophene, and a halo thiophene, a reversible polymer of formaldehyde, and an ammonium halide selected from the group consisting of ammonium chloride and ammonium bromide, in the presence of an acid having a dissociation constant not greater than about $10^{-4}$, the reactants being present in the reaction mixture in the molar proportions of thiophene compound : reversible polymer of formaldehyde : ammonium halide, of 1 to 5:0.3 to 4:0.25 to 4, to obtain a reaction mixture containing a hydrohalide salt of a basic nitrogenous condensation product, mixing said reaction mixture with an aqueous alkaline solution to decompose said hydrohalide salt and to set free said basic nitrogenous condensation product, and recovering the freed basic nitrogenous condensation product.

3. The method for producing nitrogenous condensation products having as a characterizing group the thiophene residue, $C_4H_nS$, wherein $n$ equals zero to 3, which comprises condensing at temperatures of about 65° C. to about 85° C. a thiophene compound selected from the group consisting of thiophene, an alkyl thiophene, and a halo thiophene, hexamethylenetetramine and an equimolar amount of hydrochloric acid, and an ammonium halide selected from the group consisting of ammonium chloride and ammonium bromide, the reactants being present in the reaction mixture in the molar proportions of thiophene compound : formaldehyde : ammonium halide, of 1 to 5:0.3 to 4:0.25 to 4, to obtain a reaction mixture containing a hydrohalide salt of a basic nitrogenous condensation product, mixing said reaction mixture with an aqueous alkaline solution to decompose said hydrohalide salt and to set free said basic nitrogenous condensation product, and recovering the freed basic nitrogenous condensation product.

4. A nitrogenous condensation product being water-soluble in the hydrohalide form, produced by the process set forth in claim 1.

5. A nitrogenous condensation product being water-soluble in the hydrohalide form, produced by the process set forth in claim 2.

6. Di-(2-thenyl) amine, $(C_4H_3SCH_2)_2NH$.

HOWARD D. HARTOUGH.
SIGMUND J. LUKASIEWICZ.

REFERENCES CITED

The following references are of record in the file of this patent:

UNITED STATES PATENTS

| Number | Name | Date |
|---|---|---|
| 2,114,121 | Bender | Apr. 12, 1938 |
| 2,453,085 | Caesar | Nov. 2, 1948 |
| 2,453,086 | Caesar | Nov. 2, 1948 |

FOREIGN PATENTS

| Number | Country | Date |
|---|---|---|
| 51,629 | Holland | Dec. 15, 1941 |
| 109,201 | Australia | Apr. 11, 1942 |

OTHER REFERENCES

Ser. No. 314,449, Zerweck (A.P.C.), published April 20, 1943.

Blicke: Jour. Amer. Chem. Soc., vol. 64, pages 477–480 (1942).

Hartough: Jour. Amer. Chem. Soc., vol. 68, pages 1389–1390, July 1946.

Hartough: Jour. Amer. Chem. Soc., vol. 70, pages 1146–1149 (1948).

Hartough: Jour. Amer. Chem. Soc., vol. 70, pages 4013–4017, December 1948.